(12) United States Patent
Sasaki

(10) Patent No.: US 6,512,473 B2
(45) Date of Patent: Jan. 28, 2003

(54) CLOCK SYNCHRONIZING CIRCUIT

(75) Inventor: Eisaku Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/046,921

(22) Filed: Jan. 17, 2002

(65) Prior Publication Data

US 2002/0106043 A1 Aug. 8, 2002

(30) Foreign Application Priority Data

Jan. 18, 2001 (JP) ........................................ 2001-010691

(51) Int. Cl.[7] ................................................. H03M 1/36
(52) U.S. Cl. ........................ 341/159; 341/155; 375/355
(58) Field of Search ................................ 341/159, 155, 341/111; 375/355

(56) References Cited

U.S. PATENT DOCUMENTS 5,764,171 A * 6/1998 Stikvoort .................... 327/215
6,121,910 A * 9/2000 Khoury et al. .............. 341/143
6,215,426 B1 * 4/2001 Taniguchi et al. .......... 341/111

FOREIGN PATENT DOCUMENTS

| JP | 10-224238 | 8/1998 | ............ H04B/1/04 |
| JP | 10-322405 | 12/1998 | ............ H04L/7/22 |
| JP | 11-103327 | 4/1999 | ......... H04L/21/227 |
| JP | 11-177644 | 7/1999 | ........... H04L/27/22 |

* cited by examiner

Primary Examiner—Peguy JeanPierre
(74) Attorney, Agent, or Firm—McGinn & Gibb, PLLC

(57) ABSTRACT

A clock synchronizing circuit of the present invention includes a first AD (Analog-to-Digital) converter for converting a first-channel baseband signal, which is subjected to orthogonal detection together with a second-channel baseband signal, to a first digital signal. A second AD converter converts the second-channel baseband signal to a second digital signal. A controller controls the sampling phase of the second AD converter on the basis of the first digital signal. A detector detects a shift of the sampling phase of the second digital signal relative to the first channel. An interpolator interpolates the second digital signal in accordance with a coefficient based on the shift of the sampling phase detected by the detector. Even when two channels of baseband circuits are different in electric length, the interpolator automatically, digitally cancels the difference. The circuit therefore prevents a BER (Bit Error Rate) characteristic from being degraded.

18 Claims, 8 Drawing Sheets

CLOCK SYNCHRONIZING CIRCUIT

BACKGROUND OF THE INVENTION

1. Field of the Invention

The present invention relates to a clock synchronizing circuit and more particularly to a clock synchronizing circuit applicable to a demodulating device of the type executing orthogonal modulation by digital signal processing.

2. Description of the Background Art

Recent LSI (Large Scale Integrated circuit) technologies have made it possible to apply a demodulating device of the type executing digital signal processing to a QAM (Quadrature Amplitude Modulation) high-speed communication system featuring a modulation speed of 10 MHz or above. A digital demodulating device is advantageous over an analog demodulating device in that it is free from time-varying factors and irregular characteristics. Further, a digital demodulating device can be integrated and needs no adjustment.

However, the problem with the demodulating device for QAM application is that two channels are not fully coincident as to the electric length of a baseband circuit due to, e.g., the irregular delays of analog parts. Therefore, even if sampling clocks on two channels are coincident, not both of the sampling timings of two channels are always optimal. For example, it is likely that clock control executed to optimize a P channel side shifts a Q channel side or that clock phase control executed to select the mean value of the P and Q channel sides shifts both of the P and Q channel sides. Such a shift or error is not negligible when modulation speed is high. Moreover, in the case of a quasi-synchronous detection type of demodulator, an equalizer cannot cancel the shift and causes a BER (Bit Error Rate) characteristic to be degraded. This problem is particularly serious when the number of modulation levels is great.

Technologies relating to the present invention are disclosed in, e.g., Japanese Patent Laid-Open Publication Nos. 10-224238, 10-322405, 11-103327, and 11-177644.

SUMMARY OF THE INVENTION

It is an object of the present invention to provide a clock synchronizing circuit capable of automatically compensating for a difference in electric length between baseband circuits on two channels to thereby obviate the degradation of the BER characteristic.

In accordance with the present invention, a clock synchronizing circuit includes a first AD (Analog-to-Digital) converter for converting a first-channel baseband signal, which is subjected to orthogonal detection together with a second-channel baseband signal, to a first digital signal. A second AD converter converts the second-channel baseband signal to a second digital signal. A controller controls the sampling phase of the second AD converter on the basis of the first digital signal. A detector detects a shift of the sampling phase of the second digital signal relative to the first channel. An interpolator interpolates the second digital signal in accordance with a coefficient based on the shift of the sampling phase detected by the detector.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
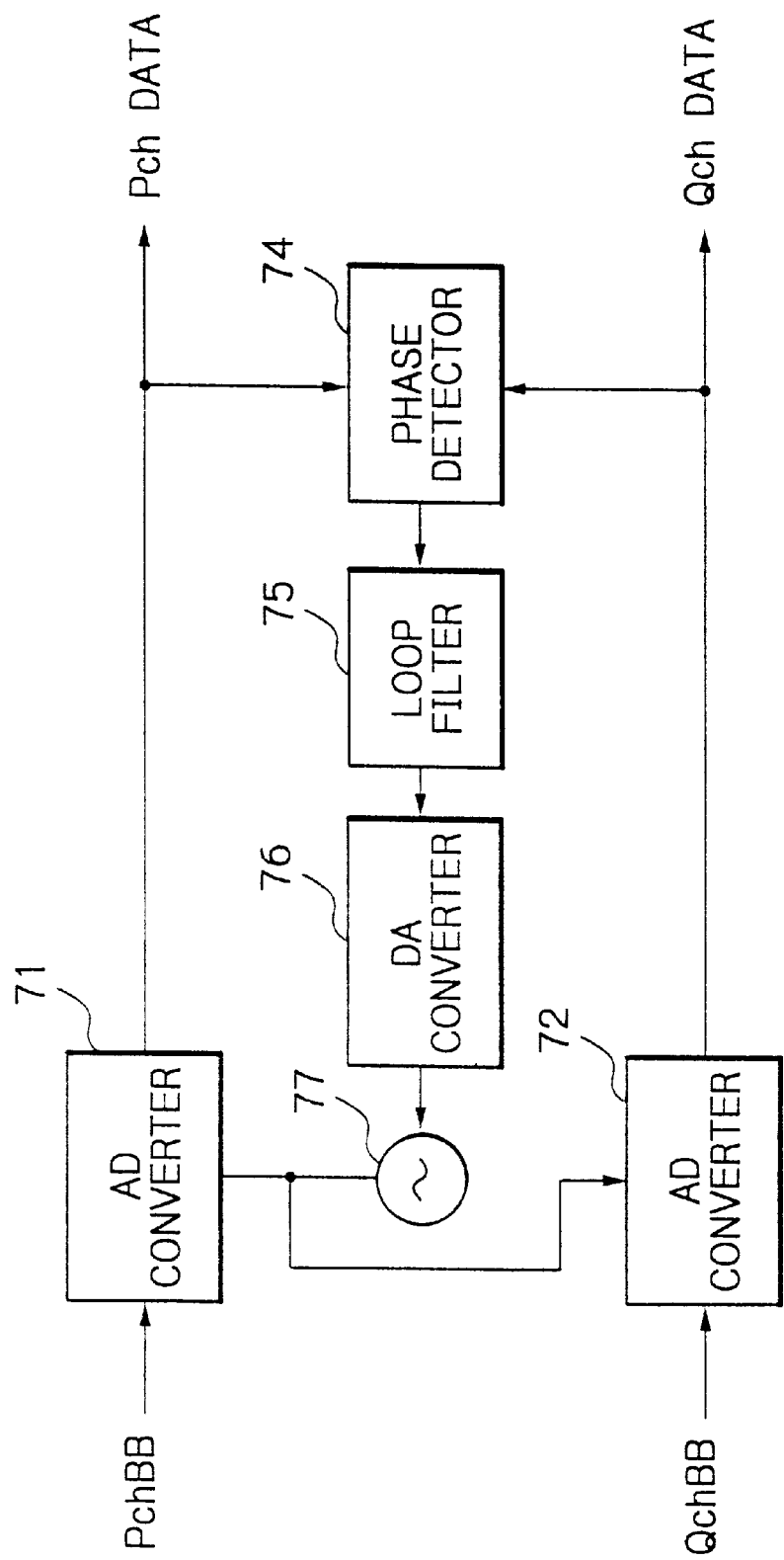
FIG. 1 is a block diagram schematically showing a conventional clock synchronizing circuit.

To better understand the present invention, brief reference will be made to a conventional clock synchronizing circuit, shown in FIG. 1. The clock synchronizing circuit shown in FIG. 1 is applied to a demodulating device of the type separating clock phase information from demodulated digital signals. As shown, the clock synchronizing circuit includes AD converters 71 and 72, a phase detector 74, a loop filter 75, a DA (Digital-to-Analog) converter 76, and a VCO (Voltage-Controlled Oscillator) 77.

Figure 2:
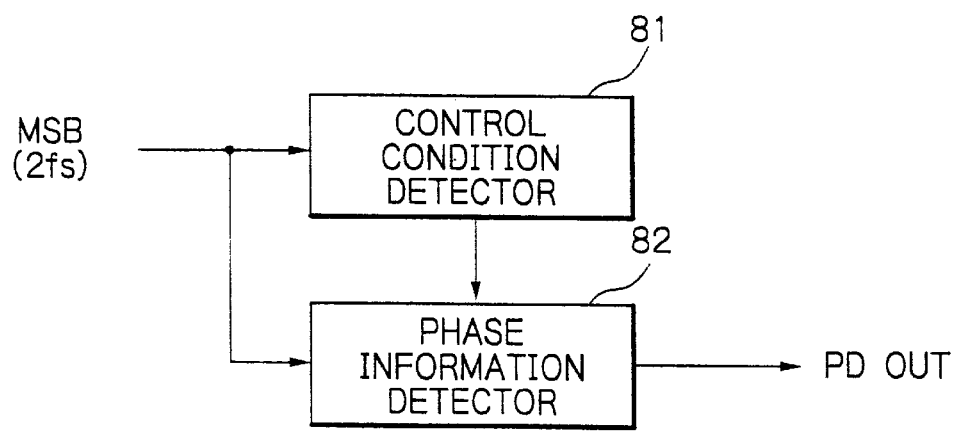
FIG. 2 is a schematic block diagram showing a specific configuration of a phase detector included in the conventional clock synchronizing circuit.

Generally, as shown in FIG. 2, a clock phase is not obtainable without a signal MSB sampled at a rate two times as high as a modulation rate (2fs). The phase detector 74 is made up of a control condition detector 81 and a phase information detector 82. The control condition detector 81 and phase information detector 82 detect a condition for obtaining a clock phase and clock phase information, respectively. Assume that three signals D1, D2 and D3 appear on each of the P and Q channels at the intervals of T/2. Then, a precondition necessary for the phase detector 74 to detect a phase is that the signals D1 and D3 be opposite in polarity to each other. If the signal D2 on one channel satisfying the above precondition is coincident with the signal D1, then the phase detector 74 determines that the phase is advanced; if otherwise, then it determines that the phase is delayed.

Figure 3:
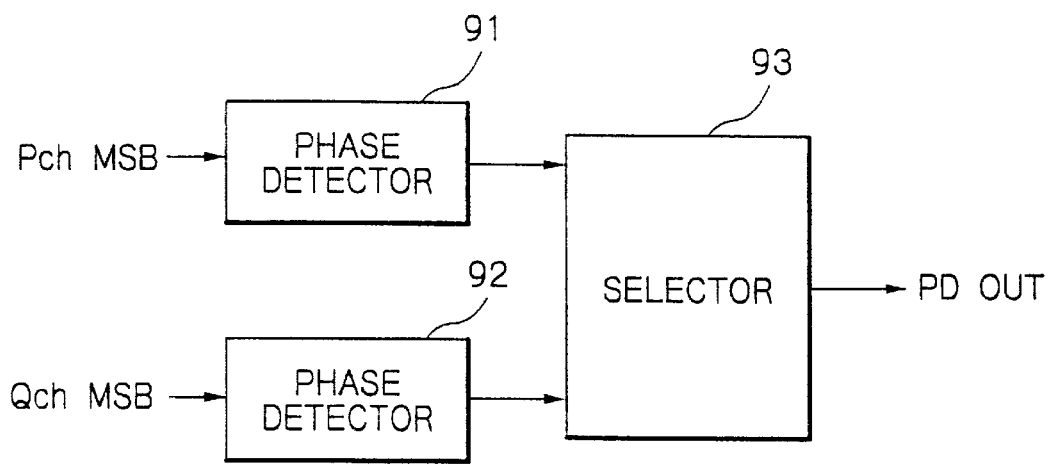
FIG. 3 is a schematic block diagram showing another specific configuration of the phase detector.

When the clock synchronizing circuit operates in the above condition, the inverted output of a ½ frequency divider, not shown, coincides with the zero-crossing timing of an eye pattern. FIG. 3 shows specific a phase detector circuit used when information on both of the P and Q channels are used. As shown, the circuit includes two phase detectors 91 and 92 and a selector 93 for selecting either one of the outputs of the phase detectors 91 and 92. The selector 93 produces an output PD OUT as the output of the phase detector circuit.

As for the final output of the demodulating device, the signal output at the doubled rate is selected in accordance with the positive-phase output clock of the ½ frequency divider. Only when the output of the phase detector 74 satisfies the preselected condition, the loop filter 75 varies its status in accordance with phase information.

Figure 4:
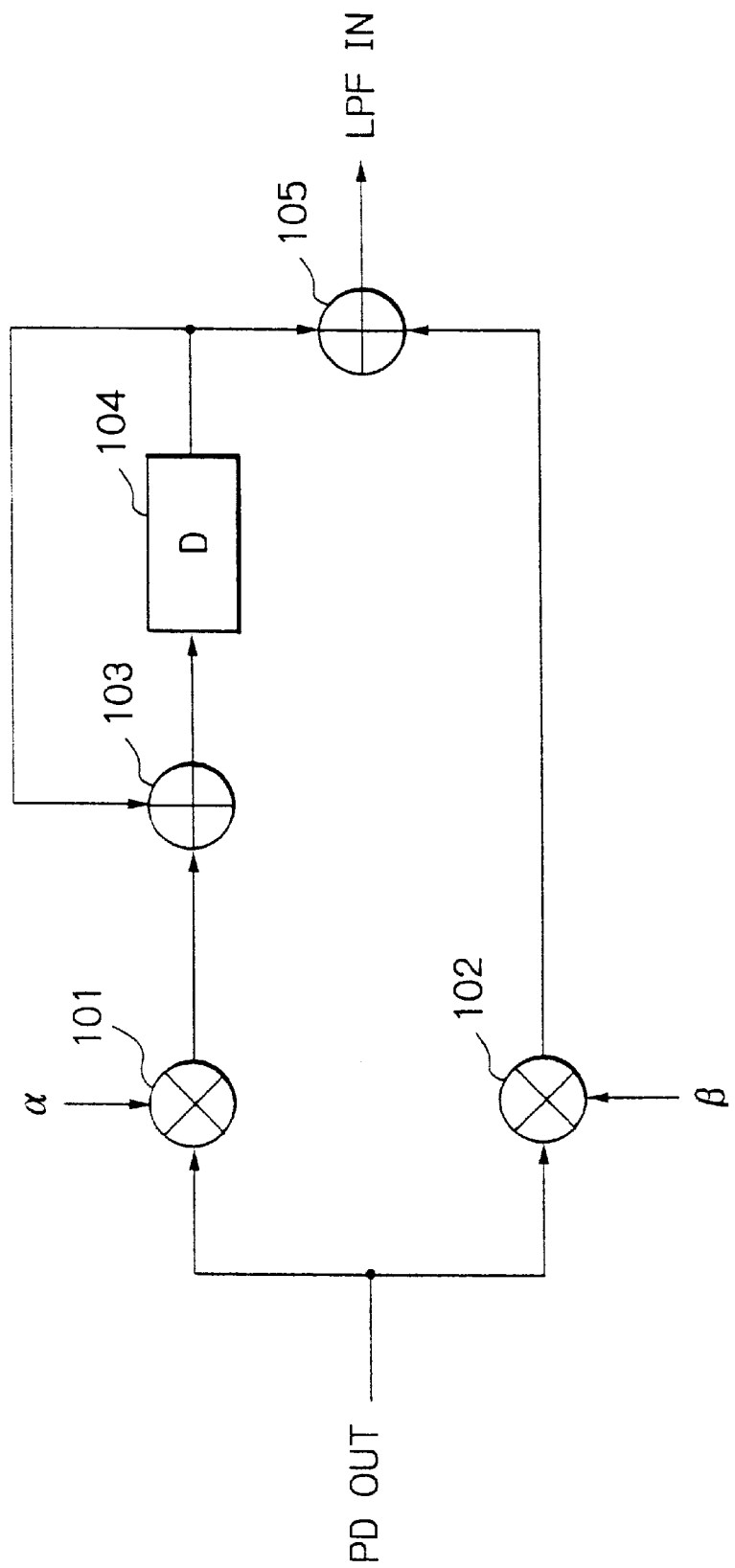
FIG. 4 is a schematic block diagram showing a specific configuration of a loop filter also included in the conventional clock synchronizing circuit.

FIG. 4 shows the loop filter 75 specifically. As shown, parameters α and β that determine a loop characteristic are input to adders 101 and 102, respectively. Referring again to FIG. 1, The VCO 77 is an analog VCO. Therefore, the DA converter 76, which converts the output of the loop filter 75 to an analog signal, is essential for connecting the VCO 77 and the loop filter 75, which is a digital circuit. The VCO 77 whose oscillation frequency is controlled by the output of the DA converter 76 feeds a sampling clock to the AD converters 71 and 72. At this time, the phase detector 74 determines a phase relation between the baseband analog signal and the sampling clock. The oscillation frequency of the VCO 77 varies in accordance with the phase relation determined by the phase detector 74. As a result, the clock phase is constantly control led to a phase optimal for sampling.

However, the two channels are not always fully coincident as to the electric length of a baseband circuit after the conversion of an IF (Intermediate Frequency) signal to a baseband signal, as stated earlier. It follows that although the sampling clocks input to the AD converters 71 and 72 are of the same phase, not both of the sampling timings of two channels are always optimal. For example, it is likely that clock control executed to optimize the P channel side shifts the Q channel side or that clock phase control executed to select the mean value of the P and Q channel sides shifts both of the P and Q channel sides.

The present invention constructed to solve the above problem is characterized by the following configuration. Assume that in an orthogonal modulation type of demodulating device, baseband circuits assigned to two channels are different from each other as to electric length after orthogonal detection. Then, when the channel-by-channel baseband signals are converted to digital signals, the present invention automatically corrects data sampled in a phase different from an optimal phase with a digital interpolating circuit. Further, the present invention recovers a clock from only one of the signals of two channels, digitally detects the shift of the phase of the other channel, and then executes interpolation in accordance with the detected shift.

Figure 5:
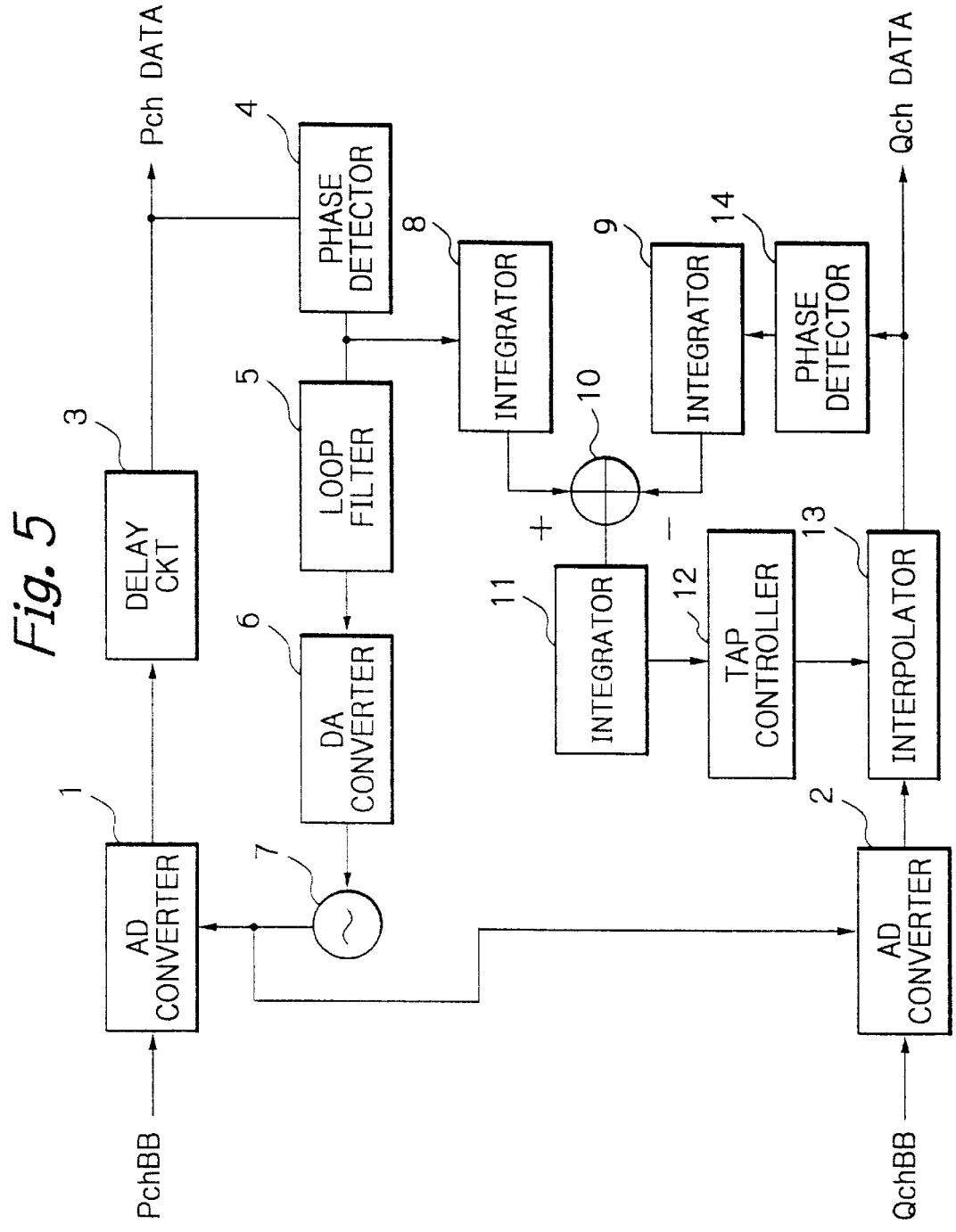
FIG. 5 is a schematic block diagram showing a clock synchronizing circuit embodying the present invention.

Referring to FIG. 5, a clock synchronizing circuit embodying the present invention will be described specifically. As shown, the clock synchronizing circuit includes AD converters 1 and 2, a delay circuit 3, phase detectors 4 and 14, a loop filter 5, a DA converter 6, a VCO 7, integrators 8, 9 and 11, a subtractor 10, a tap controller 12, and an interpolator 13. P-channel and Q-channel baseband signals Pch BB and Qch BB are input to the AD converters 1 and 2, respectively. The AD converters 1 and 2 respectively convert the baseband signals Pch BB and Qch BB to digital signals each having a plurality of bits at the period of a sampling clock.

As for the frequency of the sampling clock input to the AD converters 1 and 2, a roll-off filter is implemented by a digital signal processing circuit. Therefore, when a signal continuously varying with respect to time is present, the signal is sampled at intervals each corresponding to a frequency double the maximum frequency of the signal. This successfully implements a rate double the modulation frequency (fs), which is the minimum necessary rate, on the basis of the sampling theorem. More specifically, the original signal can be fully determined only by such sampled values.

The delay circuit 3 delays the digital signal output from the AD converter 1 by a preselected period of time and outputs the delayed digital signal as P-channel data Pch DATA. At the same time, the delay circuit 3 feeds the delayed signal to the phase detector 4. The phase detector 4 determines, based on the algorithm of a zero-crossing detection system, a difference between the optimal sampling phase and the actual sampling phase and delivers the difference to the loop filter 5.

The loop filter 5, which is a second-order, full-integration type of filter, cancels noise contained in the detected phase information. Referring again to FIG. 4, in the loop filter 5, the multipliers 101 and 102 respectively multiply the input parameters α and β by the output PD OUT of the phase detector. An adder 103 assigned to the parameter α side constitutes an integrator that performs cumulative addition. An adder 105 adds the resulting output of the parameter α side and that of the parameter β side and inputs the resulting sum to the loop filter 5 (LPF IN).

As shown in FIG. 5, the DA converter 6 converts the output of the digital loop filter 5 to an analog signal and feeds the analog signal to the VCO 7 as a control signal APC. In response, the VCO 7 delivers a sampling clock corresponding in phase to the control signal APC to the AD converters 1 and 2.

The integrators 7 and 8 respectively integrate the signals output from the phase detectors 4 and 14 and input the integrated signals to the subtractor 10. The subtractor 10 subtracts the output of the integrator 8 assigned to the Q channel from the output of the integrator 7 assigned to the P channel and feeds the resulting difference to the integrator 11. The integrator 11 integrates the output of the subtractor 10 while delivering its output to the tap controller 12.

The tap controller 12 feeds an interpolation coefficient matching with the phase output from the integrator 11 to the interpolator 13. The interpolator 13 executes convolution with the output of the AD converter 2 and the interpolation coefficient, or tap coefficient, output from the tap controller 12. The interpolator 13 feeds the resulting interpolation value to the phase detector 14 while outputting it as Q-channel data Qch DATA. The signals input to and output from the interpolator 13 have the same rate.

A specific operation of the illustrative embodiment will be described hereinafter. First, assume that the illustrative embodiment controls the clock phase by using only the P-channel signal as an information source. Then, an optimal sampling phase is obtainable from the signal input to the P-channel AD converter 1. However, the problem is that the P- and Q-channel baseband circuits differ in electric length from each other. As a result, the output of the Q-channel AD converter 2 sampled at the optimal phase of the P channel differs from an output that would appear if the input signal were sampled at the optimal phase of the Q channel. Therefore, clock phase information output from the Q-channel phase detector 14 is different from the clock phase information output from the P-channel phase detector 4.

In the illustrative embodiment, the integrators 8 and 9 cancel noise contained in the outputs of the phase detectors 4 and 14, respectively. The subtractor 10 then produces a difference between the outputs of the integrators 8 and 9, i.e., information representative of a difference between the optimal sampling phases of the P- and Q-channel AD converters 1 and 2. Therefore, generating a Q-channel signal shifted by such a phase difference is equivalent to sampling the Q-channel signal with the ADC 2 at the optimal phase of the Q channel. More specifically, if the frequency of the Q-channel signal is limited before the input of the signal to the AD converter 2 and then sampled at a rate double the modulation rate in accordance with the sampling theorem, then a signal shifted by the above phase difference can be generated by mathematical interpolation.

Generally, in a demodulating device executing digital signal processing, a roll-off filter is implemented by an FIR (Finite Impulse Response) filter. In this case, an AD converter samples an input signal at a rate more than double the modulation frequency. In this sense, increasing the sampling rate effected in the illustrative embodiment is not meant only for the interpolator 13.

Figure 6:
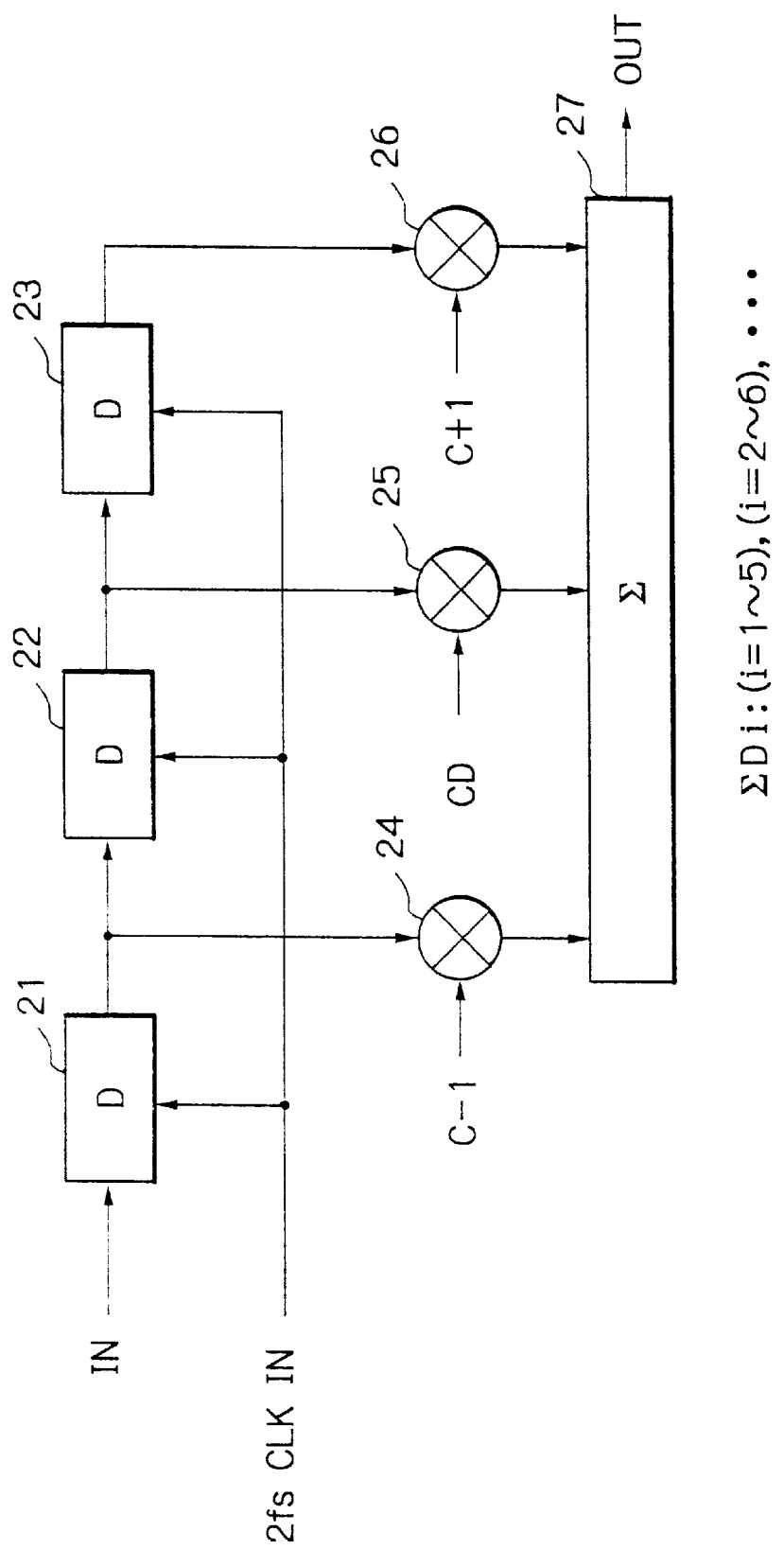
FIG. 6 is a schematic block diagram showing a specific configuration of an interpolator included in the illustrative embodiment.

While linear interpolation is practicable with simpler circuitry than other interpolation schemes, it cannot generate a signal accurate enough to detect even a shift ascribable to a slight phase difference. In practice, therefore, use is made of Lagrange interpolation or similar interpolation scheme. Assuming a third order by way of example, Lagrange interpolation produces data intervening between two of three consecutive data. FIG. 6 shows an FIR circuit including three tap coefficients C-1, C0 and C+1 each corresponding to a particular phase difference between two data. By replacing the tap coefficient, it is possible to vary the interpolation phase.

The order may be raised for more accurate interpolation, if desired. Stated another way, interpolation can be executed with any possible phase difference if tap coefficients identical in number with expected phase differences are prepared by calculation beforehand. This, however, is not practicable without scaling up a memory circuit for storing the tap coefficients. In practice, the phase of the Q-channel signal only slightly differs from the phase of the P-channel signal. It therefore suffices to prepare a number of tap coefficients accommodating a step width that is necessary in the range of expected phase differences (e.g. 1 nsec). More specifically, several ten tap coefficients suffice that successfully scale down the memory circuit.

Figure 7:
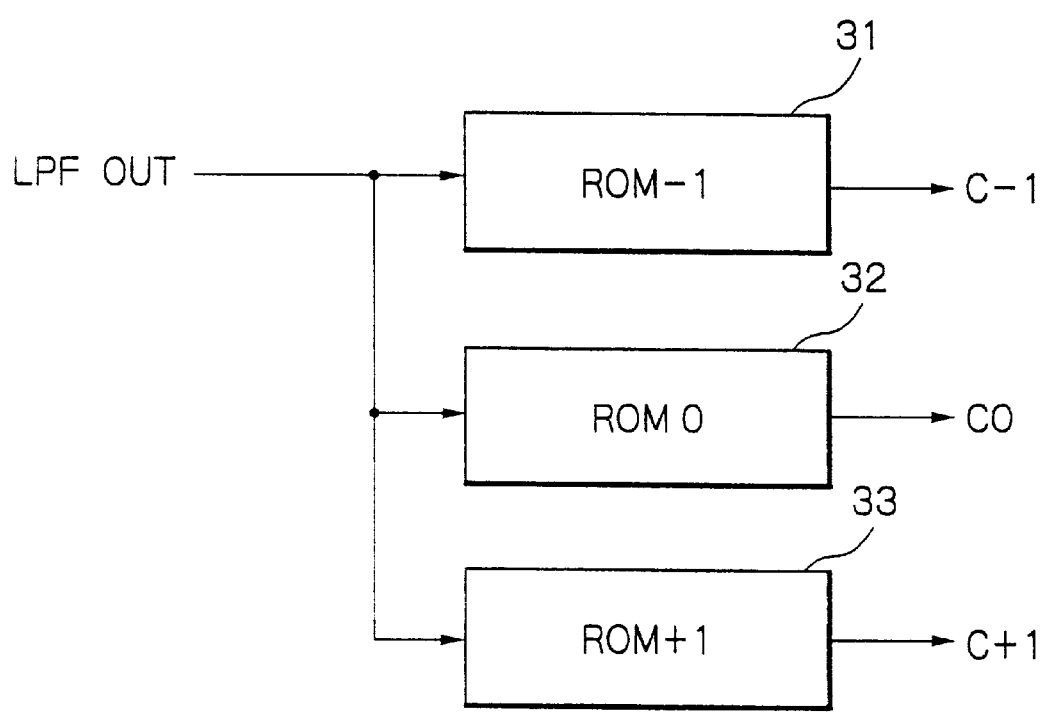
FIG. 7 is a schematic block diagram showing a specific configuration of a tap controller also included in the illustrative embodiment.

FIG. 7 shows a specific configuration of the tap controller 12. As shown, the tap controller 12 includes three ROMs (Read Only Memories) 31, 32 and 33 each storing a particular tap coefficient. The addresses of the ROMs 31 through 33 correspond to a phase difference each. The difference in optimal sampling phase between the P- and Q-channel signals is integrated and then input to the addresses of the ROMs 31 through 33. As a result, the Q-channel signal is optimally sampled by the output of the interpolator 14. In this manner, a control loop that reduces the above difference to zero is implemented, as will be described more specifically with reference to FIG. 8.

Figure 8:
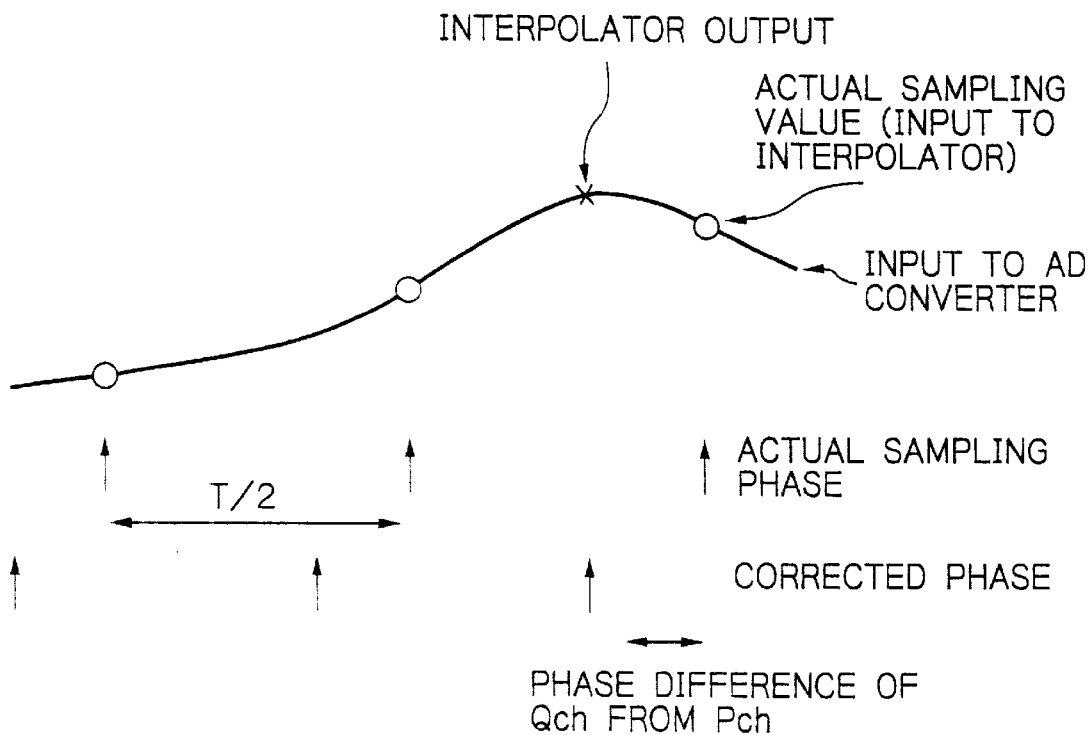
FIG. 8 shows a specific waveform of a signal input to an AD (Analog-to-Digital) converter also included in the illustrative embodiment.

In FIG. 8, circles are representative of values output from the Q-channel AD converter 2, i.e., sampled by the optimal phase of the P channel. Assume that the AD converter 2 outputs a value represented by a cross when using the optimal phase of the Q channel. Then, the interpolator 13, FIG. 5, receives three data represented by circles and then outputs the result of convolution effected with the above data and a tap coefficient corresponding to a difference in phase of the Q channel from the P channel. The result of convolution has the value represented by the cross. It should be noted that the phase is, of course, based on the P-channel information with respect to time, i.e., the P and Q channels are identical in phase. Consequently, the P- and Q-channel signals both are sampled in the optimal phase.

Figure 9:
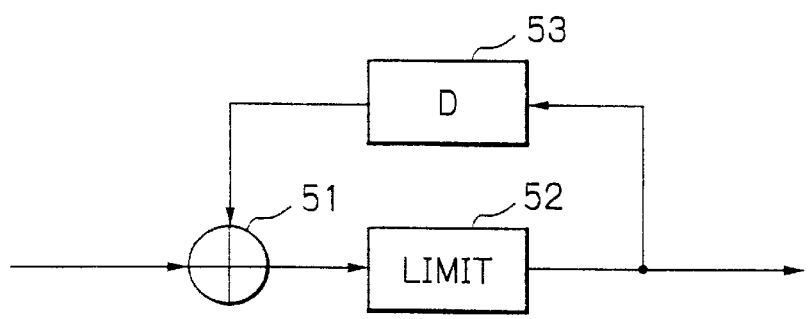
FIG. 9 is a schematic block diagram showing a specific configuration of an integrator further included in the illustrative embodiment.

FIG. 9 shows a specific integrator circuit. As shown, the integrator sequentially adds a value appeared one clock pulse before to an input signal, thereby determining its output. Therefore, when the control loop is equilibrated, the input to the integrator becomes zero while the output from the integrator remains constant.

Figure 10:
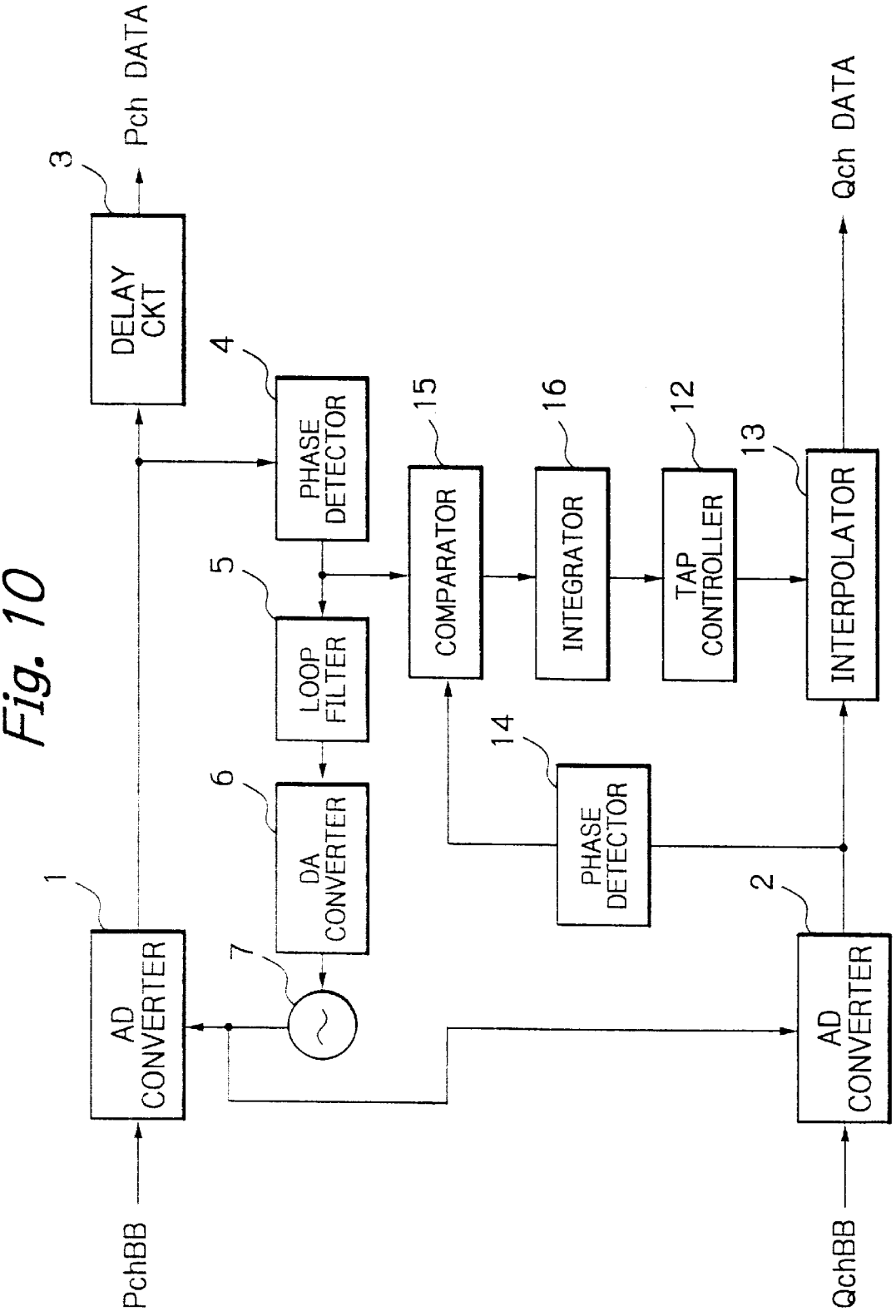
FIG. 10 is a schematic block diagram showing an alternative embodiment of the present invention.

FIG. 10 shows an alternative embodiment of the present invention. As shown, the P- and Q-channel AD converters 1 and 2 each detect the phase of the associated clock. A comparator 15 produces a difference of the Q-channel output from the P-channel output while an integrator 16 integrates the difference. The tap controller 12 controls the tap coefficient in accordance with the output of the integrator 16. The interpolator 16 therefore outputs a Q-channel signal corresponding to the optimal sampling phase. In this manner, the alternative embodiment executes open loop control by contrast to the previous embodiment executing closed loop control.

The present invention is practicable with either one of a synchronous detection system and a quasi-synchronous detection system. Further, in the embodiments shown and described, a digital circuit produces information representative of a difference in clock phase. Alternatively, the interpolator 13 configured to cancel a phase difference by using such information may be implemented by an analog circuit connected to the clock input of the A/D converter, e.g., an LC (coil and capacitor) phase shifter with a varactor diode. This successfully reduces the number of digital circuits.

In summary, it will be seen that the present invention provides a clock synchronizing circuit having various unprecedented advantages, as enumerated below.

(1) Even when baseband circuits on two channels are different in electric length, an interpolator automatically, digitally cancels the difference. The circuit therefore prevents the BER characteristic from falling, compared to the conventional circuit. (2) The circuit recovers a clock from only one of two channel signals, digitally detects a phase difference of the other channel signal, and then executes interpolation matching with the phase difference. This allows both of two channels signals to be sampled in an optimal phase.

(3) Because the entire circuit is digital, it can be integrated together with a digital demodulator and, of course, does not need any manual adjustment.

Various modifications will become possible for those skilled in the art after receiving the teachings of the present disclosure without departing from the scope thereof.

What is claimed is:

1. A clock synchronizing circuit comprising:

first AD (Analog-to-Digital) converting means for converting a first-channel baseband signal, which is subjected to orthogonal detection together with a second-channel baseband signal, to a first digital signal;

second AD converting means for converting the second-channel baseband signal to a second digital signal;

control means for controlling a sampling phase of said second AD converting means on the basis of said first digital signal;

detecting means for detecting a shift of the sampling phase of the second digital signal relative to the first channel; and interpolating means for interpolating the second digital signal in accordance with a coefficient based on the shift of the sampling phase detected by said detecting means.

2. A clock synchronizing circuit comprising:
first AD converting means for converting a first-channel baseband signal, which is subjected to orthogonal detection together with a second-channel baseband signal, to a first digital signal;
second AD converting means for converting the second-channel baseband signal to a second digital signal;
a delay circuit for delaying the first digital signal by a preselected period of time to thereby output a delayed first digital signal;
a first phase detector for detecting phase information out of the delayed first digital signal;
an interpolator for interpolating the second digital signal in accordance with a tap coefficient to thereby output an interpolated second digital signal;
a second phase detector for detecting phase information out of the interpolated second digital signal;
a first integrator for integrating the phase information output from said first phase detector;
a second integrator for integrating the phase information output from said second phase detector;
a subtractor for subtracting an output of said second integrator from an output of said first integrator;
a third integrator for integrating an output of said subtractor;
a tap controller for feeding a tap coefficient corresponding to an output of said third integrator to said interpolator;
a loop filter for canceling noise contained in an output of said first phase detector;
a DA (Digital-to-Analog) converter for converting an output of said loop filter to an analog signal; and
a VCO (Voltage Controlled Oscillator) for feeding a sampling clock whose phase corresponds to the analog signal output from said DA converter to said first AD converter and said second AD converter.

3. The circuit as claimed in claim 2, wherein said interpolator executes convolution with the tap coefficient output from said tap controller and the second digital signal output from said second AD converter.

4. The circuit as claimed in claim 2, wherein said first phase detector and said second phase detector determine a difference between an optimal sampling phase and an actual sampling phase by using an algorithm of a zero-crossing detection system.

5. The circuit as claimed in claim 4, wherein said interpolator executes convolution with the tap coefficient output from said tap controller and the second digital signal output from said second AD converter.

6. A clock synchronizing circuit comprising:
first AD converting means for converting a first-channel baseband signal, which is subjected to orthogonal detection together with a second-channel baseband signal, to a first digital signal;
second AD converting means for converting the second-channel baseband signal to a second digital signal;
a delay circuit for delaying the first digital signal by a preselected period of time to thereby output a delayed first digital signal;
a first phase detector for detecting phase information out of the first digital signal;
a second phase detector for detecting phase information out of the second digital signal;
an interpolator for interpolating the second digital signal in accordance with a tap coefficient to thereby output an interpolated second digital signal;
a comparator for comparing the phase information output from said first phase detector and the phase information output from said second phase detector;
an integrator for integrating an output of said comparator;
a tap control circuit for feeding a tap coefficient corresponding to an output of said integrator to said interpolator;
a loop filter for canceling noise contained in an output of said first phase detector;
a DA converter for converting an output of said loop filter to an analog signal; and
a VCO for feeding a sampling clock whose phase corresponds to the analog signal output from said DA converter to said first AD converter and said second AD converter.

7. The circuit as claimed in claim 6, wherein said interpolator executes convolution with the tap coefficient output from said tap controller and the second digital signal output from said second AD converter.

8. The circuit as claimed in claim 6, wherein said first phase detector and said second phase detector determine a difference between an optimal sampling phase and an actual sampling phase by using an algorithm of a zero-crossing detection system.

9. The circuit as claimed in claim 8, wherein said interpolator executes convolution with the tap coefficient output from said tap controller and the second digital signal output from said second AD converter.

10. A clock synchronizing method comprising:
a first AD converting step for converting a first-channel baseband signal, which is subjected to orthogonal detection together with a second-channel baseband signal, to a first digital signal;
a second AD converting step for converting the second-channel baseband signal to a second digital signal;
a controlling step for controlling a sampling phase of said second AD converting step on the basis of said first digital signal;
a detecting step for detecting a shift of the sampling phase of the second digital signal relative to the first channel; and
an interpolating step for interpolating the second digital signal in accordance with a coefficient based on the shift of the sampling phase detected by said detecting step.

11. A clock synchronizing method comprising:
a first AD converting step for converting a first-channel baseband signal, which is subjected to orthogonal detection together with a second-channel baseband signal, to a first digital signal;
a second AD converting step for converting the second-channel baseband signal to a second digital signal;
a delaying step for delaying the first digital signal by a preselected period of time to thereby output a delayed first digital signal;
a first phase detecting step for detecting phase information out of the delayed first digital signal;
an interpolating step for interpolating the second digital signal in accordance with a tap coefficient to thereby output an interpolated second digital signal;
a second phase detecting step for detecting phase information out of the interpolated second digital signal;
a first integrating step for integrating the phase information output by said first phase detecting step;

a second integrating step for integrating the phase information output by said second phase detecting step;

a subtracting step for subtracting an output of said second integrating step from an output of said first integrating step;

a third integrating step for integrating an output of said subtracting step;

a tap controlling step for feeding a tap coefficient corresponding to an output of said third integrating step to said interpolating step;

a noise canceling step for canceling noise contained in an output of said first phase detecting step;

a DA converting step for converting an output of said noise canceling step to an analog signal; and a feeding step for feeding a sampling clock whose phase corresponds to the analog signal output from said DA converting step to said first AD converting step and said second AD converting step.

12. The method as claimed in claim 11, wherein said interpolating step executes convolution with the tap coefficient output from said tap controlling step and the second digital signal output from said second AD converting step.

13. The method as claimed in claim 11, wherein said first phase detecting step and said second phase detecting step determine a difference between an optimal sampling phase and an actual sampling phase by using an algorithm of a zero-crossing detection system.

14. The method as claimed in claim 13, wherein said interpolating step executes convolution with the tap coefficient output from said tap controlling step and the second digital signal output from said second AD converting step.

15. A clock synchronizing method comprising:

a first AD converting step for converting a first-channel baseband signal, which is subjected to orthogonal detection together with a second-channel baseband signal, to a first digital signal;

a second AD converting step for converting the second-channel baseband signal to a second digital signal;

a delaying step for delaying the first digital signal by a preselected period of time to thereby output a delayed first digital signal;

a first phase detecting step for detecting phase information out of the first digital signal;

a second phase detecting step for detecting phase information out of the second digital signal;

an interpolating step for interpolating the second digital signal in accordance with a tap coefficient to thereby output an interpolated second digital signal;

a comparing step for comparing the phase information output by said first phase detecting step and the phase information output by said second phase detecting step;

an integrating step for integrating an output of said comparing step;

a tap controlling step for feeding a tap coefficient corresponding to an output of said integrating step to said interpolating step;

a noise canceling step for canceling noise contained in an output of said first phase detecting step;

a DA converting step for converting an output of said noise canceling step to an analog signal; and a feeding step for feeding a sampling clock whose phase corresponds to the analog signal output from said DA converting step to said first AD converting step and said second AD converting step.

16. The method as claimed in claim 15, wherein said interpolating step executes convolution with the tap coefficient output from said tap controlling step and the second digital signal output from said second AD converting step.

17. The method as claimed in claim 15, wherein said first phase detecting step and said second phase detecting step determine a difference between an optimal sampling phase and an actual sampling phase by using an algorithm of a zero-crossing detection system.

18. The method as claimed in claim 17, wherein said interpolating step executes convolution with the tap coefficient output from said tap controlling step and the second digital signal output from said second AD converting step.

* * * * *